T. W. FITZGERALD.
INDICATOR FOR MEASURING OR WEIGHING MACHINES AND DEVICES.
APPLICATION FILED MAY 31, 1912.

1,089,336.

Patented Mar. 3, 1914.
3 SHEETS—SHEET 1.

WITNESSES:
M. E. Flaherty
A. E. O'Brien

INVENTOR:
Thomas W. Fitzgerald
By
Coale & Hayes
his attorneys.

T. W. FITZGERALD.
INDICATOR FOR MEASURING OR WEIGHING MACHINES AND DEVICES.
APPLICATION FILED MAY 31, 1912.
1,089,336.
Patented Mar. 3, 1914.
3 SHEETS—SHEET 3.
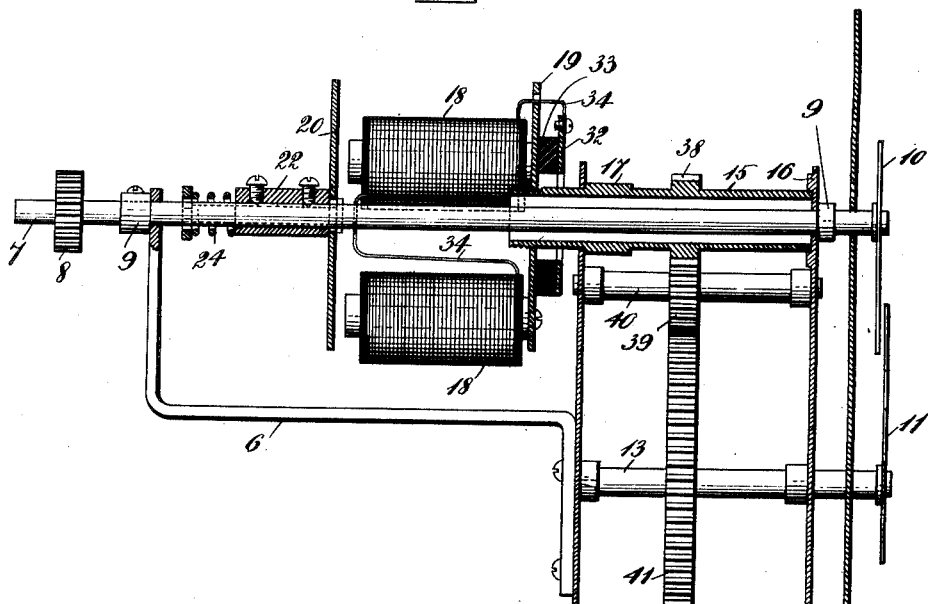
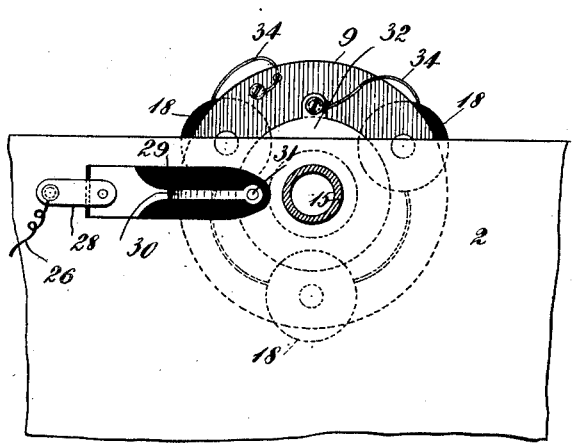
WITNESSES:
M. E. Flaherty.
A. E. O'Brien.
INVENTOR=
Thomas W. Fitzgerald
By
Call + Hay
his attorneys.

UNITED STATES PATENT OFFICE.

THOMAS W. FITZGERALD, OF BOSTON, MASSACHUSETTS.

INDICATOR FOR MEASURING OR WEIGHING MACHINES AND DEVICES.

1,089,336.  Specification of Letters Patent.  Patented Mar. 3, 1914.

Application filed May 31, 1912. Serial No. 700,587.

*To all whom it may concern:*

Be it known that I, THOMAS W. FITZGERALD, of Boston, in the county of Suffolk and State of Massachusetts, a citizen of the United States, have invented a new and useful Improvement in Indicators for Measuring or Weighing Machines and Devices, of which the following is a full, clear, and exact description, reference being had to the accompanying drawings, forming a part of this specification, in explaining its nature.

The indicator embodying my invention is essentially applicable to measuring machines for measuring the length of objects or materials or to weighing machines. In fact, it may advantageously be applied to any type of machine in which it is desired to obtain a primary indication of length, time or distance, or a secondary indication of the resultant or accumulation of a number or series of primary indications successively taken.

In the types of machines to which my present invention is applicable the operation of the machine is to rotate a shaft or spindle, the movement or extent of its rotation being commensurate with the length or weight of the thing measured or weighed. Where a number of things are successively weighed or measured in order to determine or indicate the length or weight of a given thing it becomes necessary that the rotary shaft or spindle become reversed and restored to its original position of rotation or starting point before measuring or weighing the thing. This must be done in such manner that it will not disturb or change the secondary indicating mechanism or that indicating the accumulation or result of successive measurements or weights previously taken.

It is accordingly the object of my invention to provide an improved apparatus whereby the rotary shaft or spindle of the primary indicating mechanism may be restored to its original position or starting point without influencing or disturbing the secondary indicating mechanism. In other words, it is my object to provide as accurate a register as possible.

My invention can best be seen and understood by reference to the drawings in which—

Figure 1:
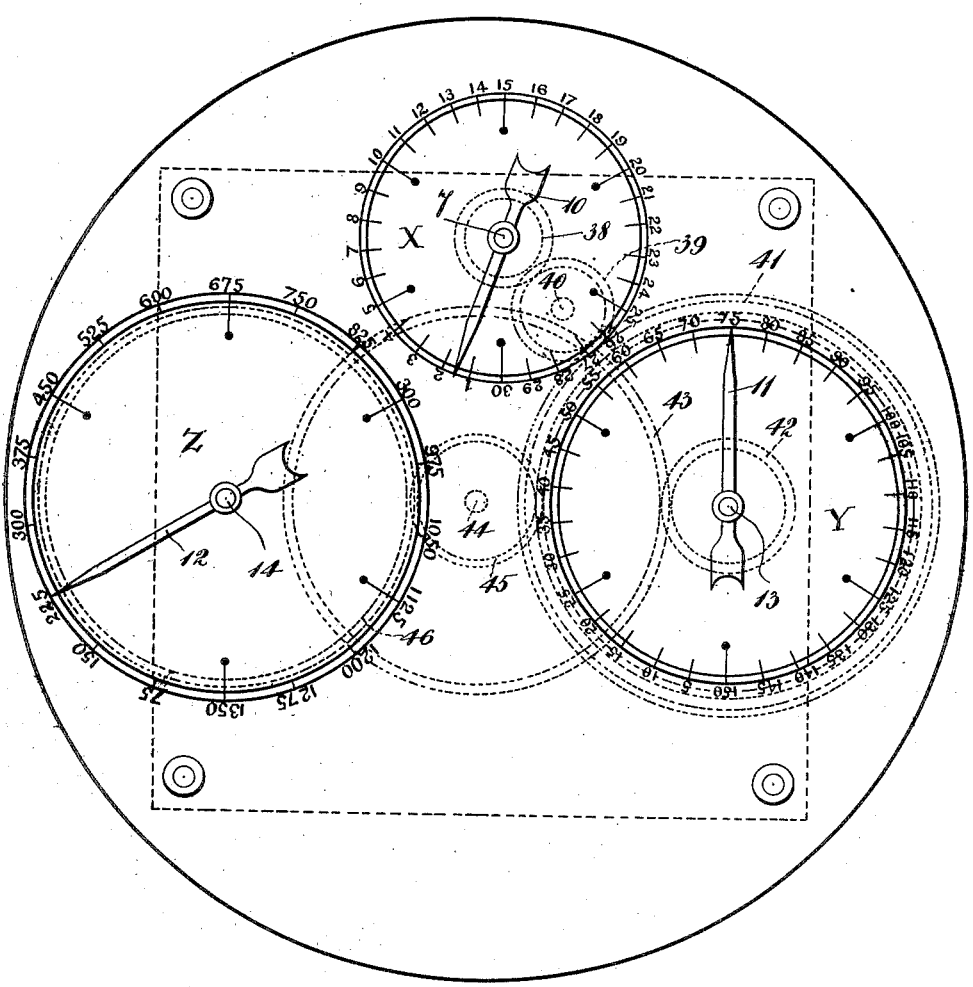
Figure 2:
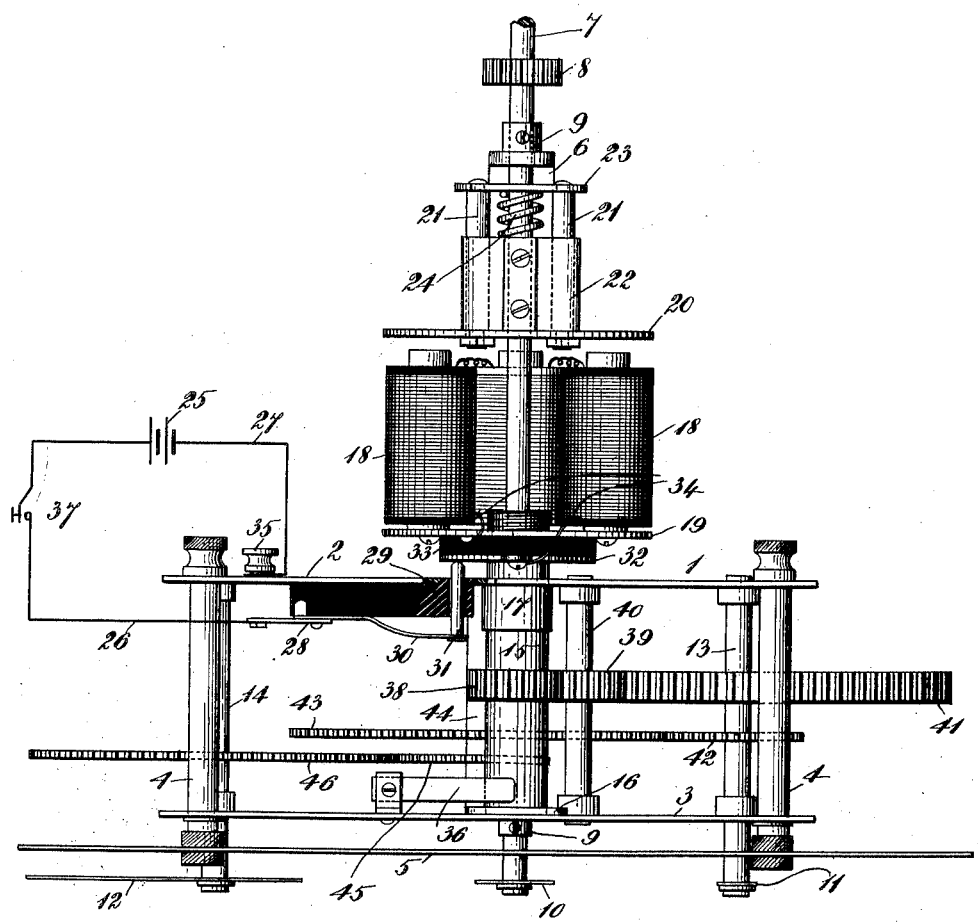

Figure 1 shows the indicator in front elevation. Fig. 2 is a plan of the same. Fig. 3 is a vertical longitudinal section, and Fig. 4 shows in front elevation a detail of construction to which reference will hereinafter be made.

Referring to the drawings:—1 represents a frame or casing consisting of spaced plates 2 and 3, respectively. These plates are joined by corner posts 4. The posts 4 extend beyond the plate 3 and support also a dial plate 5 arranged in front of this plate. From the rear side of the plate 2 there extends a bracket 6.

7 represents a spindle or shaft which is adapted to be rotated by the main machine to which the indicator is applied, rotation being effected through a gear or pinion 8 on the spindle in the customary manner. The amount or extent of rotation of this spindle is commensurate with the length of the thing measured or weighed. The spindle extends through the bracket 6, plates 2 and 3 and dial plate 5. It is journaled to turn in the plate 3 and supporting bracket and is held against endwise movement by means of stops 9 arranged just outside of and adjacent said plate and bracket. The spindle bears upon its end a hand 10 coöperating with a dial X on the dial plate. As the spindle is turned the hand will turn with it over the face of this dial indicating thereon the extent of rotation of the spindle and consequently, in proper terms of units, the length or weight of the object or thing measured.

The hand 10 carried by the spindle is merely a temporary indicating hand for indicating the measurement or weight of a single object and is turned back to its starting or zero point on the dial X when a new object or thing is measured or weighed. This is done by reversing the spindle. The reversal of the spindle and consequent return of the indicating hand is accomplished in the operation of the main machine as is well known to those skilled in the art.

For the purpose of providing indication of an accumulation of measurements or weights of things successively taken and separately indicated by the hand 10, the dial plate is provided with one or more other dials having hands coöperating therewith and which have a slower movement than the hand 10, the same comprising with its operating parts what may be termed a secondary indicating mechanism. For purposes of illustration the dial plate is shown provided with two other dials Y and Z with hands 11 and 12 coöperating respectively therewith, the hand 11 traveling more slowly than the hand 10 and the hand 12 more slowly than the hand 11 as is customary in indicators of the presnt type. The hands 11 and 12 are arranged upon shafts 13 and 14, respectively, extending between the sides or plates 2 and 3 of the frame and journaled to turn therein. These shafts and hands carried thereby are turned from off the spindle 7 and only as it is turned progressively. In other words, the respective indicating hands 11 and 12 are operated to turn over their respective dials only as the spindle 7 is turned in taking a measurement, the shafts of the secondary mechanism bearing these hands being entirely disconnected from the spindle at all other times and especially during the time when the spindle is reversed and the indicating hand 10 carried by it returned to its starting point on the dial X preliminary to taking a new measurement.

Arranged concentric with the spindle 7 is a hollow shaft 15. This shaft is much larger than the spindle and independent thereof, the interior being removed from the spindle in order that there may be no frictional contact between the parts. The shaft 15 is supported by the plates 2 and 3 of the frame between which the shaft extends, the same extending, also, through the plate 2 to project beyond the same. At its forward end the shaft is journaled to turn in a bearing 16 formed on the inner side of the plate 3. The shaft is also journaled to turn in the plate 2 through which it extends. The shaft is held against endwise movement by the plate 3 at one end and by a collar 17 formed upon the shaft which bears against the inside of the plate 2 around the opening in it through which the shaft extends. The shaft carries upon its end, or the end projecting beyond the plate 2, an electro-magnet 18. I prefer to employ as shown three of these magnets arranged around the spindle 7. The magnets are secured to a plate 19 threaded or otherwise fixed to the shaft 15 and accordingly are mounted to rotate with the shaft.

20 represents the armature of the magnets. This is carried by the spindle 7 and is secured thereto in the following manner: Fixed to the armature to project from the rear side thereof parallel with the spindle are rods 21. These rods extend through a butt 22 fixed to the spindle, the rods being mounted to slide longitudinally in this butt. The ends of the rods are connected by a crosshead 23 through which the spindle extends. Arranged upon the spindle between the crosshead and adjacent end of the butt is a coil spring 24 the tension of which is such as to normally hold the armature against the forward end of the butt out of engagement with the magnets, but in a position to be attracted thereby and drawn into engagement therewith when the magnets are energized. By the clutch thus formed the shaft 15 will be connected with the spindle to rotate in unison therewith.

The magnets are energized by the passage of an electric current through their magnetizing coils, the circuit being provided for as follows: 25 represents any suitable source of electrical supply with which connect wires 26 and 27 of an electric circuit. Of these wires the wire 26 connects with a terminal 28 arranged upon an insulating block 29 fixed to the inner side of the plate 2 of the frame. Connecting with this terminal and forming a part of the circuit is a spring bar 30 carrying a pin 31. This pin projects through the block 29 and through the plate 2 (being insulated therefrom by the block projecting through the plate around the opening in it through which the pin extends) and has wiping contact with an annular plate 32 carried by the plate 19 to which the magnets are secured. The plates 32 and 19 are separated by an interposed insulating piece or block 33. Secured to the conducting plate 32 is the wire 34 of the magnetizing coils or that with which the magnets are wound in series. This wire passes from the conducting plate 32 through the plate 19 being insulated therefrom by a covering of some non-conducting material or in any suitable manner and thence around the bars of the respective magnets. The opposite end of the magnetizing coil or wire is secured to the plate 19 which is secured as above described to the shaft 15 journaled to turn within the plates 2 and 3 of the frame. This shaft and also the frame are made of metal and with the conducting wire 27 complete the circuit, the wire 27 connecting with the plate 3 of the frame by a binding post 35 fixed to the plate while electrical communication is established between the plate 3 of the frame and the shaft 15 by means of a spring finger 36 which has a continuous wiping contact with the shaft. The circuit is controlled, and consequently the energizing of the magnets, by any suitable make and break device or mechanism (diagrammatically shown) at the point 37 therein.

In the operation of the parts as thus described when the circuit is closed the energizing of the magnets will tend to attract and draw the armature to them overcoming the tension of the spring 24 by which the armature is held in its retracted position. The arm thus continues to be held by the magnets as long as the circuit is kept closed and during this time the spindle 7 of the primary indicating mechanism and the shaft 15 of the secondary mechanism will be coupled to rotate together. At the instant the circuit is broken, however, the magnets will no longer avail to hold the armature against the tension of its controlling spring which will then operate to restore the armature to its original position when the spindle will no longer be coupled to the shaft 15 and may be rotated in any direction and independently thereof. In this connection it will be explained that in order that the armature may be released at the very instant the circuit is broken I have in practice found it advisable to cover the face of the armature or that portion thereof engaging the magnets with paper or some other thin material which forms a partial insulation.

When the spindle 7 is coupled, as above described, to the shaft 15 any motion imparted to the spindle will likewise be imparted to the shaft 15 and the motion thus imparted to the shaft 15 is transmitted for turning the respective shafts 13 and 14 and indicating hands 11 and 12 carried respectively thereby in the following manner: Upon the shaft 15 is a gear 38. Meshing with this gear is a gear 39 mounted upon a shaft 40 journaled to turn in and between the plates 2 and 3 of the frame. The gear 39 meshes with a gear 41 upon the shaft 13 carrying the indicating hand 11. The shaft 13 carries also a gear 42 meshing with a gear 43 arranged upon a shaft 44 turning between the plates 2 and 3 of the frame. This shaft carries also a gear 45 meshing with a gear 46 mounted upon the shaft 14 carrying the indicating hand 12. The adaptability of these geared connections is such that as the spindle 7 and indicating hand 10 carried by it is turned the indicating hand 11 will also be turned more slowly than the indicating hand 10 and the indicating hand 12 more slowly than the indicating hand 11 through all the hands will indicate upon their respective dials the same relative extent of movement of the spindle and consequently the length of the object measured. Inasmuch as the hand 11 moves more slowly than the hand 10 it will accordingly have one complete revolution indicating successive movements or revolutions of the hand 10 and likewise the hand 12 moving more slowly than the hand 11, will have one complete revolution indicating an amount equal to that indicated by a number of revolutions of the hand 11 and also the resultant of a large number of indications of the hand 10 aggregating a considerable length or amount.

The operation or method of using the indicator is as follows:—Preliminary to measuring or weighing a single object the main machine or device with which the indicator is coöperating will be moved to occupy an initial or starting position and in assuming such position will have moved the spindle 7 back to a position where the indicating hand 10 will point to the zero or starting point on the scale X. During this operation the electric current will have been broken through the make and break mechanism and the magnet accordingly deënergized and the armature 20 forming the link connection between the primary and secondary indicating mechanism moved back by the spring 24 into a disengaging position. The electric circuit is now again completed, thereby energizing the magnets and attracting the armature. Connection is now established between the primary and secondary indicating mechanisms and the measurement or weight of the object or thing taken through the operation of the main machine and spindle. After the measurement is completed the circuit is broken and the operation continued as above explained. In this connection it is especially to be observed that during the reversal of the main machine and return of the indicating hand 10 to the zero point the secondary indicating mechanism will be entirely disengaged from the primary indicating mechanism so that whatever the operation of the spindle may be it will have no effect upon the secondary mechanism.

Having thus fully described my invention, I claim and desire to secure by Letters Patent of the United States:—

1. In an indicator, the combination with a frame, of a primary indicating mechanism having a rotary spindle, a secondary indicating mechanism having a rotary shaft independent of said spindle, means for coupling said spindle and shaft together whereby they may rotate in unison, said means comprising an electro-magnetic device having separate members consisting of a magnet and armature carried respectively by said spindle and shaft to rotate therewith, means for maintaining said members in a disengaging position and where they may have an engaging position and become coupled together upon energizing said magnet, and means for controlling said magnet.

2. In an indicator, the combination with a frame, of a primary indicating mechanism having a rotary spindle, a secondary indicating mechanism having a rotary shaft independent of said spindle, means for coupling said spindle and shaft whereby they may be connected to rotate in unison, the same comprising an electro-magnetic device having a magnet and armature carried respectively by said spindle and shaft, means for yieldingly retaining said armature in a position removed from said magnet and where it may be attracted to and held by it, and means for controlling said magnet.

3. In an indicator, the combination with a frame, of a primary indicating mechanism having a rotary spindle, a secondary indicating mechanism having a rotary shaft, an electro-magnet carried by said spindle to rotate therewith, an armature for said magnet carried by said shaft to rotate therewith, means for yieldingly retaining said armature in a position removed from said magnet where it may be attracted by it, and means for controlling said magnet to attract said armature by the completion of an electric circuit.

4. In an indicator, the combination with a frame, of a primary indicating mechanism having a rotary spindle, a secondary indicating mechanism having a rotary shaft concentric with said spindle but independent thereof, and an electrically-controlled clutch-forming mechanism for coupling said shaft and spindle to rotate in unison, the same having a magnet and armature carried respectively by said spindle and shaft to rotate therewith, and means for controlling said magnet and armature to have engagement or disengagement with one another by the making or breaking of an electric circuit.

5. In an indicator, the combination with a frame, of a primary indicating mechanism having a rotary spindle, a secondary indicating mechanism having a rotary shaft, an electrically-controlled friction clutch-forming mechanism having parts carried respectively by said shaft and spindle to rotate therewith, and means for controlling the parts of said clutch-forming mechanism to have engagement or disengagement with respect to one another dependent upon the making or breaking of an electric circuit.

6. In an indicator, the combination with a frame, of a primary indicating mechanism having a spindle and indicating hand carried by it, a secondary indicating mechanism having an indicating hand and rotary shaft, means whereby the motion of said shaft may be transmitted for turning the indicating hand of said secondary mechanism, and means for coupling said shaft and spindle to rotate in unison, the same comprising an electrically-controlled friction clutch-forming mechanism having an electro-magnet and an armature, the same being carried respectively by said spindle and shaft to rotate therewith, and means whereby said armature may be controlled to have frictional engagement or disengagement with said magnet through the making or breaking of an electric circuit.

7. In an indicator, the combination with a frame, of a primary indicating mechanism having a rotary spindle, a secondary indicating mechanism having a rotary shaft concentric with said spindle but independent thereof, an electro-magnet carried by said shaft to rotate therewith, an armature carried by said spindle to rotate therewith, means for controlling said armature to have engagement or disengagement with said magnet dependent upon the establishment of an electric circuit through said magnet or the breaking of said circuit, and means whereby an electric circuit having therein a make and break mechanism or device may be established through said magnet.

THOMAS W. FITZGERALD.

Witnesses:
JOHN E. R. HAYES,
M. E. FLAHERTY.